US012744940B2

(12) United States Patent
Wenger et al.

(10) Patent No.: US 12,744,940 B2
(45) Date of Patent: Sep. 22, 2026

(54) MARKING OF GENERATIVE ARTIFICIAL INTELLIGENCE GENERATED OR MODIFIED CONTENT

(71) Applicant: TENCENT AMERICA LLC, Palo Alto, CA (US)

(72) Inventors: Stephan Wenger, Palo Alto, CA (US); Arianne Hinds, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/903,509

(22) Filed: Oct. 1, 2024

(65) Prior Publication Data

US 2025/0184540 A1 Jun. 5, 2025

Related U.S. Application Data

(60) Provisional application No. 63/605,391, filed on Dec. 1, 2023, provisional application No. 63/542,739, filed on Oct. 5, 2023.

(51) Int. Cl.
*H04N 19/70* (2014.01)
*H04N 19/172* (2014.01)
*H04N 19/189* (2014.01)

(52) U.S. Cl.
CPC ........... *H04N 19/70* (2014.11); *H04N 19/172* (2014.11); *H04N 19/189* (2014.11)

(58) Field of Classification Search
CPC ..... H04N 19/70; H04N 19/172; H04N 19/189
See application file for complete search history.

(56) References Cited

U.S. PATENT DOCUMENTS

2009/0080855 A1 3/2009 Senftner et al.
2012/0230429 A1 9/2012 Boyce et al.
2014/0092994 A1 4/2014 Wang
2020/0053408 A1* 2/2020 Park ...................... G06T 3/4046
2020/0234508 A1 7/2020 Shaburov et al.
2020/0314246 A1 10/2020 Hart
2020/0359104 A1 11/2020 Luo et al.
(Continued)

OTHER PUBLICATIONS

Chen et al. ("AHG9: Common text for proposed generative face video SEI message", Joint Video Experts Team (JVET) of ITU-T SG 16 WP 3 and ISO/IEC JTC 1/SC 29, 31st Meeting, Geneva, CH, Jul. 11-19, 2023, Document: JVET-AE0280-v1) (Year: 2023).*
(Continued)

*Primary Examiner* — Maria E Vazquez Colon
(74) *Attorney, Agent, or Firm* — Sughrue Mion, PLLC

(57) ABSTRACT

A method and apparatus comprising computer code for video processing, the method including setting a first value of a text description purpose parameter in a bitstream, the first value of the text description purpose parameter indicating a type of information included in a text description information string in the bitstream; setting artificial intelligence (AI) marking information associated with one or more pictures in the bitstream as the text description information string when the first value indicates that the type of information included in the text description information string comprises marking information associated with one or more artificial intelligence processes used; signaling the text description purpose parameter in the bitstream; and signaling the text description information string.

20 Claims, 8 Drawing Sheets

601

| ai_mark (payloadSize) { | Description |
|---|---|
| ai_mark_cancel_flag | u(1) |
| if(!ai_mark_cancel_flag){ | |
| ai_mark_persistence_flag | u(1) |
| ai_mark_string | u(v) |
| }} | |

630

| ai_mark (payloadSize) { | Description |
|---|---|
| ai_mark_cancel_flag | u(1) |
| if(!ai_mark_cancel_flag){ | |
| ai_mark_persistence_flag | u(1) |
| ai_tool_id_string | st(v) |
| ai_timestamp_string | st(v) |
| ai_person_id_presence_flag | u(1) |
| if (ai_person_id_presence_flag) | |
| ai_person_id | st(v) |
| ai_instructions_presence_flag | u(1) |
| if (ai_person_id_presence_flag) | |
| ai_instruction | st(v) |
| ai_base_content_presence_flag | u(1) |
| if (ai_base_content_presence_flag) | |
| ai_base_content | st(v) |
| ai_other_regulatory | st(v) |
| } | |
| } | |

(56) References Cited

U.S. PATENT DOCUMENTS

| | | | | |
|---|---|---|---|---|
| 2021/0377554 | A1* | 12/2021 | Kim | G06N 3/0464 |
| 2024/0223813 | A1* | 7/2024 | Chen | H04N 19/70 |

OTHER PUBLICATIONS

International Search Report issued Jan. 10, 2025 in Application No. PCT/US2024/049924.

Written Opinion of the International Searching Authority issued Jan. 10, 2025 in Application No. PCT/US2024/049924.

International Search Report issued Feb. 13, 2025 in Application No. PCT/IB2024/061637.

Written Opinion of the International Searching Authority issued Feb. 13, 2025 in Application No. PCT/IB2024/061637.

* cited by examiner

FIG. 4

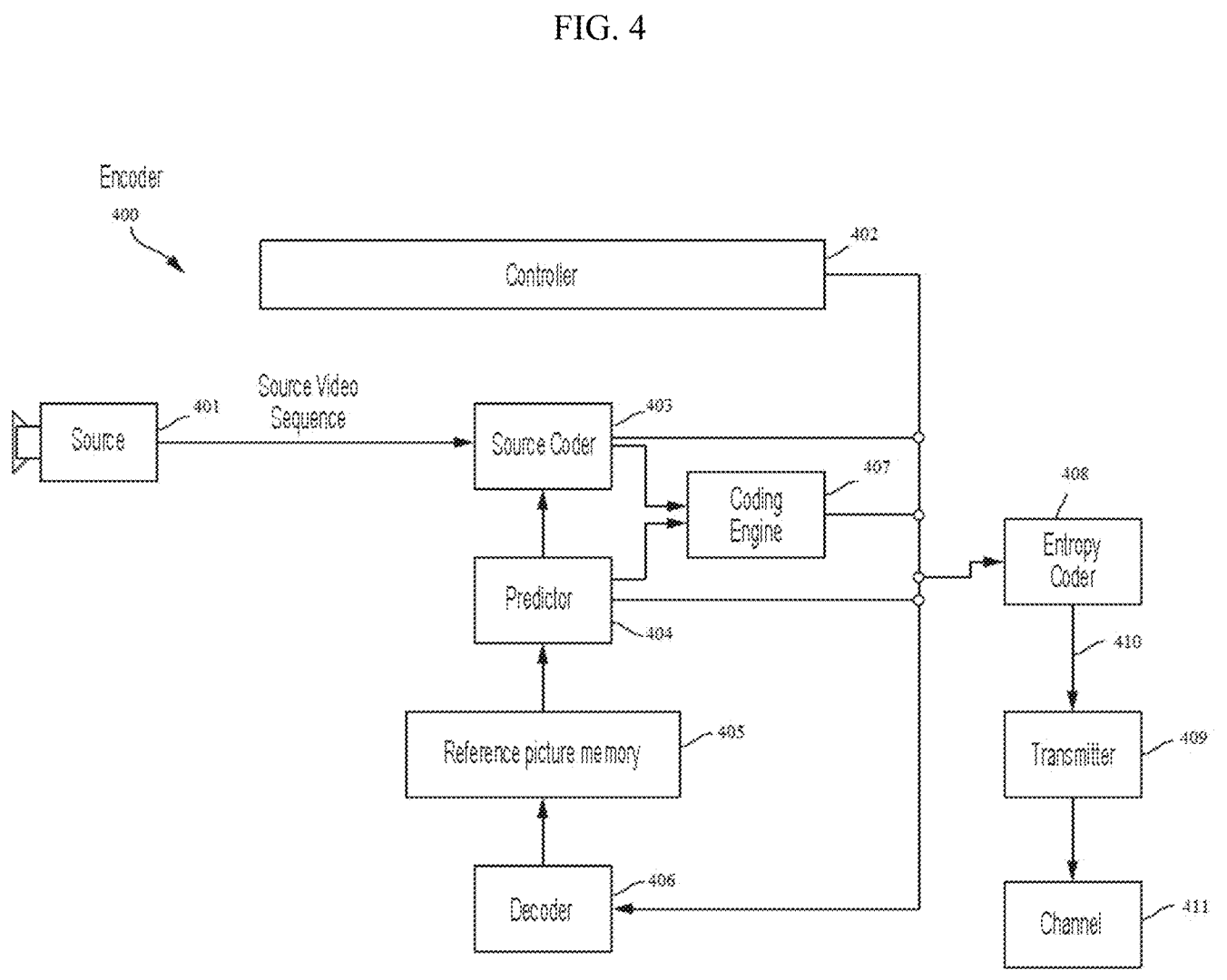

Encoder 400
Source 401
Source Video Sequence
Controller 402
Source Coder 403
Predictor 404
Reference picture memory 405
Decoder 406
Coding Engine 407
Entropy Coder 408
410
Transmitter 409
Channel 411 nal_unit_header 502
NAL Unit 501
502
503
504
505
506
507
nal_unit_header() {
Description
forbidden_zero_bit
f()
nuh_reserved_zero_bit
u()
nuh_layer_id
u()
nuh_unit_type
u()
nuh_temporal_id_plus1
u()
}
510
DCI 512
VPS 513
SPS 514
Prefix-APS 516
PH 517
Prefix-SEI 518
VCL NAL 519
Suffix-SEI 518
Decoding Order 510
530
530
nal_unit_header 521
payload_type_byte 522
payload_size_byte 522
Payload 524
payload_type_byte 522
payload_size_byte 522
Payload 524
520

| ai_mark (payloadSize) { | Description |
|---|---|
| ai_mark_cancel_flag | u(1) |
| If(!ai_mark_cancel_flag){ | |
| ai_mark_persistence_flag | u(1) |
| ai_mark_string | u(v) |
| }} | |

610, 611, 612, 620

630

| ai_mark (payloadSize) { | Description |
|---|---|
| ai_mark_cancel_flag | u(1) |
| If(!ai_mark_cancel_flag){ | |
| ai_mark_persistence_flag | u(1) |
| ai_tool_id_string | st(v) |
| ai_timestamp_string | st(v) |
| ai_person_id_presence_flag | u(1) |
| if (ai_person_id_presence_flag) | |
| ai_person_id | st(v) |
| ai_instructions_presence_flag | u(1) |
| if (ai_person_id_presence_flag) | |
| ai_instruction | st(v) |
| ai_base_content_presence_flag | u(1) |
| if (ai_base_content_presence_flag) | |
| ai_base_content | st(v) |
| ai_other_regulatory | st(v) |
| } | |
| } | |

610, 612, 631, 632, 633, 634, 636, 637, 638, 639, 635

701
702
Instructions
703
704
705
706
Metadata
707
708
709
SEI
710
711
712
713
Streaming Server 714
Internet
715
719
Render er 720
721
WARNING: AI generated Content
722
723

MARKING OF GENERATIVE ARTIFICIAL INTELLIGENCE GENERATED OR MODIFIED CONTENT

CROSS REFERENCE TO RELATED APPLICATION

The present application claims priority to U.S. Provisional Application No. 63/542,739, filed on Oct. 5, 2023, and U.S. Provisional Application No. 63/605,391, filed on Dec. 1, 2023, the disclosures of which are incorporated herein in their entireties.

FIELD

Embodiments of this disclosure are directed to video coding and decoding. Specifically, embodiments of the present disclosure are related to the marking of the involvement of generative artificial intelligence in the creation or modification of an image or video in the form of an Supplementary Enhancement Information (SEI) message.

BACKGROUND

Uncompressed digital video can consist of a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 GB/s bandwidth. An hour of such video requires more than 600 GB of storage space.

Accordingly, video coding and decoding can be the reduction of redundancy in the input video signal, through compression. Compression can help reducing aforementioned bandwidth or storage space requirements, in some cases by two orders of magnitude or more. Both lossless and lossy compression, as well as a combination thereof can be employed.

Lossless compression refers to techniques where an exact copy of the original signal can be reconstructed from the compressed original signal. When using lossy compression, the reconstructed signal may not be identical to the original signal, but the distortion between original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

Generative Artificial Intelligence, (henceforth "generative AI" or "AI" may be used to create or modify images or sequences of images (e.g., video). For example, in related art, there exist applications and web pages on the world wide web that allow the generation of an image—a map of pixels—from a string that is entered into the application. The images may be downloaded and processed by image compression tools including, for example, an encoder complying with one of H.266's still image profiles. Accordingly, image or video manipulation is possible. For example, so-called deep-fakes are known to exist that take source images or videos and manipulate them in a way that was not intended by the original content creator. A common example is an audio-visual sequence of a politician where the audio stream has been modified such that the politician is making statements he/she would not make in person, and the video is manipulated to synchronize with the modified audio (lip movements, gestures, and similar).

The image and video generation/manipulation is of a quality that it takes a trained observer or image analysis tools to identify that the image or video was created or manipulated by generative AI. Accordingly, annotations to identify that an image or video was created or manipulated by generative AI is needed, and also needed is an associated standard.

SUMMARY

According to an embodiment, a method and apparatus comprising computer code for video processing is provided. The method including setting a first value of a text description purpose parameter in a bitstream, the first value of the text description purpose parameter indicating a type of information included in a text description information string in the bitstream; setting artificial intelligence (AI) marking information associated with one or more pictures in the bitstream as the text description information string when the first value indicates that the type of information included in the text description information string comprises marking information associated with one or more artificial intelligence processes used; signaling the text description purpose parameter in the bitstream; and signaling the text description information string.

According to an embodiment, an apparatus for video processing is provided. The apparatus may include at least one memory configured to store program code; and at least one processor configured to read the program code and operate as instructed by the program code. The program code may include receiving code configured to cause the at least one processor to receive a coded video bitstream comprising pictures; first obtaining code configured to cause the at least one processor to obtain a first value of a text description purpose parameter in the coded video bitstream, the first value of the text description purpose parameter indicating a type of information included in a text description information string in the coded video bitstream; second obtaining code configured to cause the at least one processor to, responsive to the first value indicating that the type of information included in the text description information string comprises marking information associated with one or more artificial intelligence processes used, obtain an artificial intelligence (AI) marking information associated with one or more pictures in the coded video bitstream as the text description information string in the coded video bitstream; and reconstructing code configured to cause the at least one processor to reconstruct the pictures from the coded video bitstream based on the first value and the AI marking information.

According to an embodiment, a non-transitory computer-readable medium storing instructions is provided. The instructions may include: one or more instructions that, when executed by one or more processors of a device, cause the one or more processors to perform a conversion between a visual media file and a bitstream of the visual media file, wherein the bitstream includes at least one of: a text description purpose parameter indicating a type of information included in a text description information string; and artificial intelligence (AI) marking information associated with one or more pictures in the visual media file as the text description information string when the text description purpose parameter indicates that the type of information included in the text description information string comprises marking information associated with one or more artificial intelligence processes used; and wherein the format rule specifies that the text description purpose parameter and the text description information string are syntax parameters in a supplemental enhancement information (SEI) message.

BRIEF DESCRIPTION OF THE DRAWINGS

Further features, nature, and various advantages of the disclosed subject matter will be more apparent from the following detailed description and the accompanying drawings in which:

FIG. 4 is a schematic illustration of a simplified block diagram of a video encoder, in accordance with embodiments of the present disclosure.

FIG. 6 is a an illustration of an SEI message syntax, in accordance with embodiments of the present disclosure.

DETAILED DESCRIPTION

The following detailed description of example embodiments refers to the accompanying drawings. The same reference numbers in different drawings may identify the same or similar elements.

Figure 1:
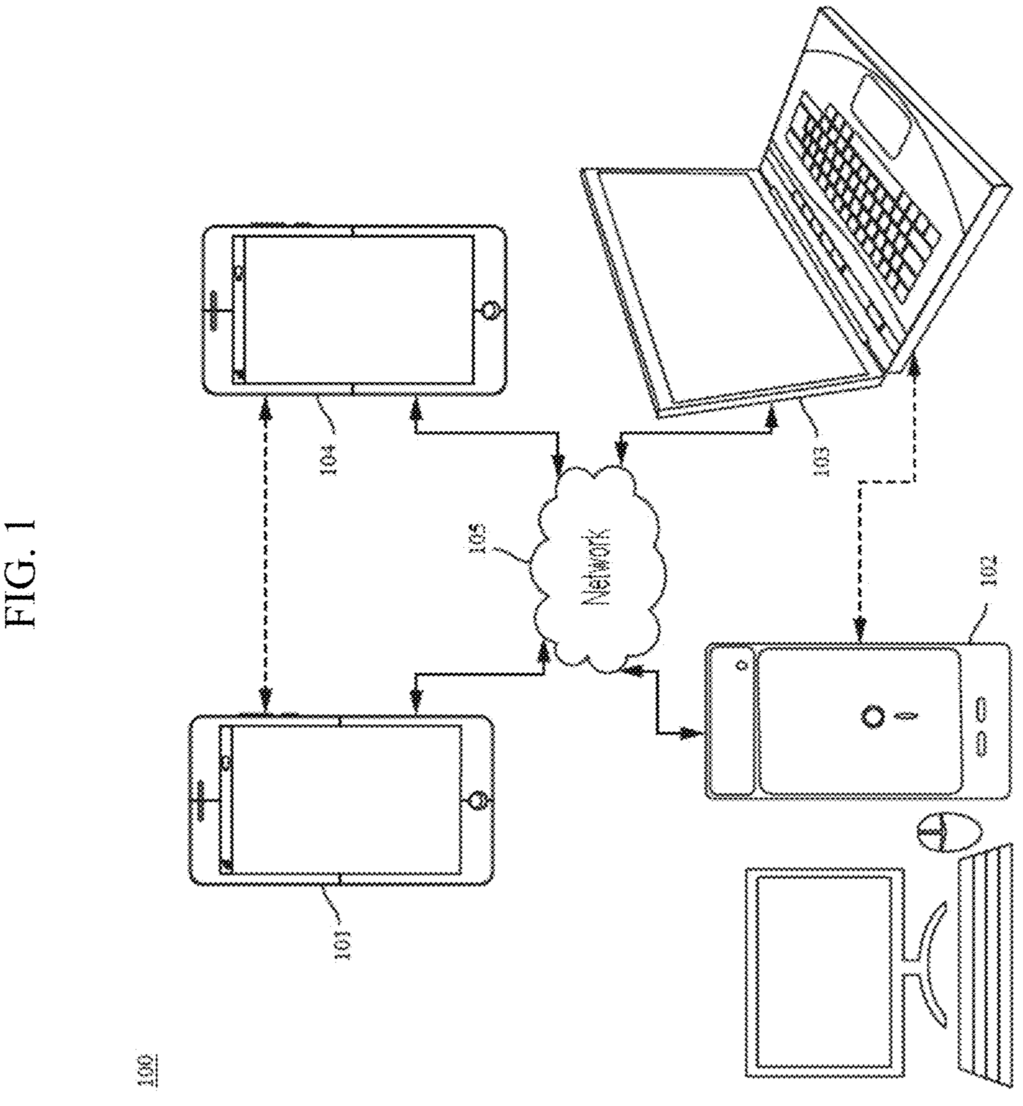
FIG. 1 is a schematic illustration of a simplified block diagram of a communication system, in accordance with embodiments of the present disclosure.

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below.

Figure 2:
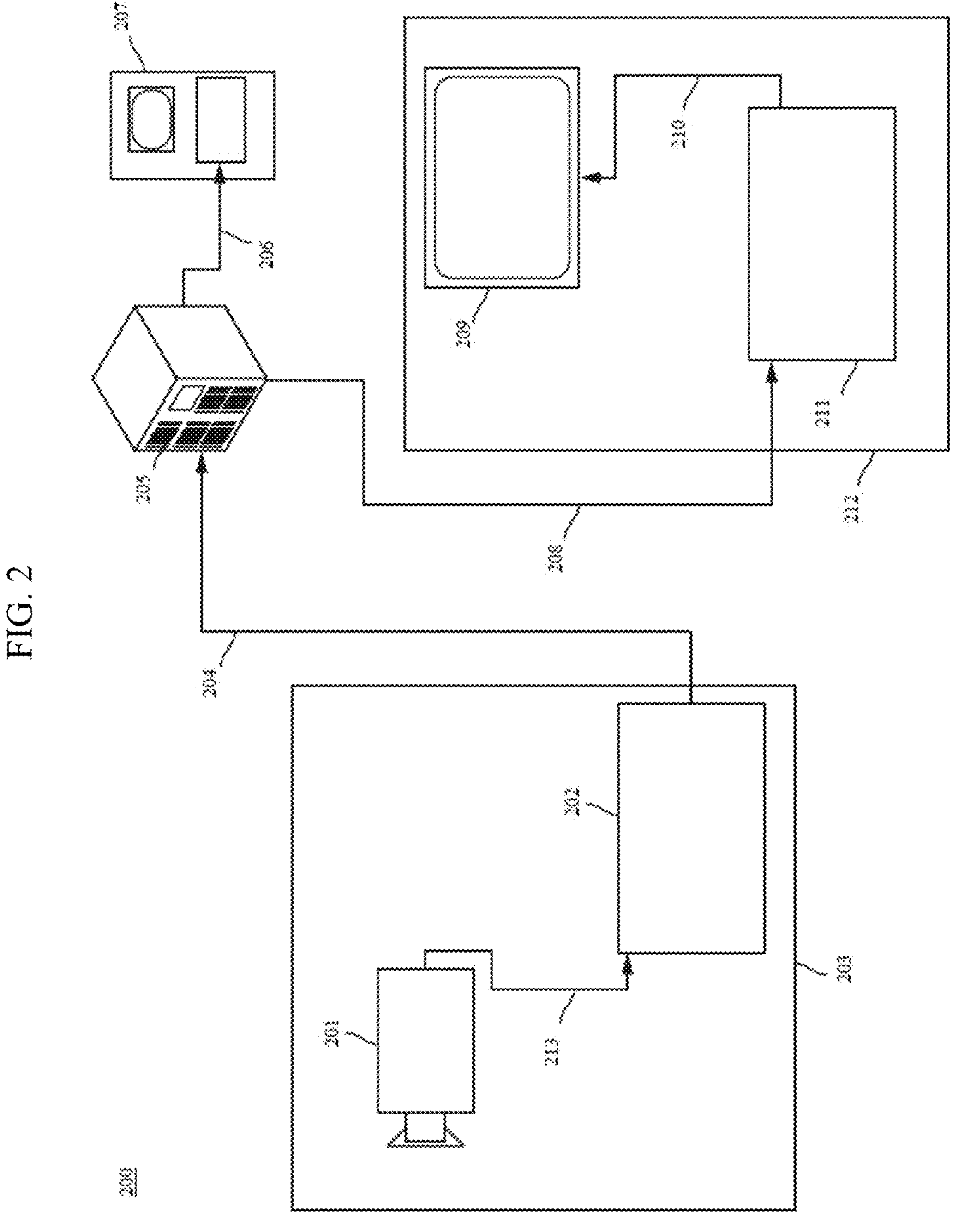
FIG. 2 is a schematic illustration of a simplified block diagram of a streaming system, in accordance with embodiments of the present disclosure.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem 203, that can include a video source 201, for example a digital camera, creating, for example, an uncompressed video sample stream 213. That sample stream 213 may be emphasized as a high data volume when compared to encoded video bitstreams and can be processed by an encoder 202 coupled to the camera 201. The encoder 202 can include hardware, software, or a combination thereof to enable or implement aspects of the disclosed subject matter as described in more detail below. The encoded video bitstream 204, which may be emphasized as a lower data volume when compared to the sample stream, can be stored on a streaming server 205 for future use. One or more streaming clients 212 and 207 can access the streaming server 205 to retrieve copies 208 and 206 of the encoded video bitstream 204. A client 212 can include a video decoder 211 which decodes the incoming copy of the encoded video bitstream 208 and creates an outgoing video sample stream 210 that can be rendered on a display 209 or other rendering device. In some streaming systems, the video bitstreams 204, 206 and 208 can be encoded according to certain video coding/compression standards. Examples of those standards are noted above and described further herein.

Figure 3:
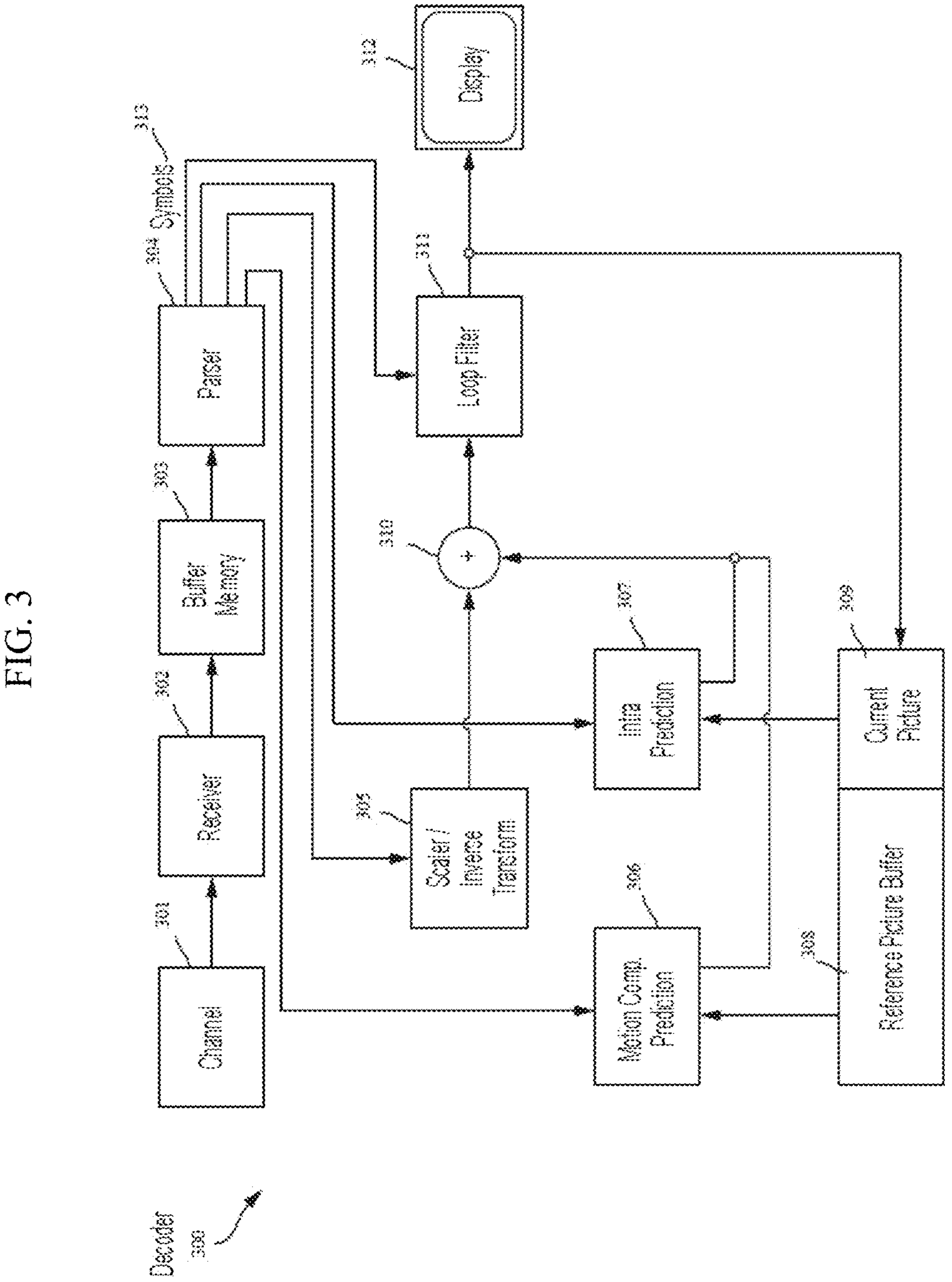
FIG. 3 is a schematic illustration of a simplified block diagram of a video decoder, in accordance with embodiments of the present disclosure.

FIG. 3 may be a functional block diagram of a video decoder 300 according to an embodiment of the present invention.

A receiver 302 may receive one or more codec video sequences to be decoded by the decoder 300; in the same or another embodiment, one coded video sequence at a time, where the decoding of each coded video sequence is independent from other coded video sequences. The coded video sequence may be received from a channel 301, which may be a hardware/software link to a storage device which stores the encoded video data. The receiver 302 may receive the encoded video data with other data, for example, coded audio data and/or ancillary data streams, that may be forwarded to their respective using entities. The receiver 302 may separate the coded video sequence from the other data. To combat network jitter, a buffer memory 303 may be coupled in between receiver 302 and entropy decoder/parser 304 ("parser" henceforth). When receiver 302 is receiving data from a store/forward device of sufficient bandwidth and controllability, or from an isosynchronous network, the buffer 303 may not be needed, or can be small. For use on best effort packet networks such as the Internet, the buffer 303 may be required, can be comparatively large and can advantageously of adaptive size.

The video decoder 300 may include a parser 304 to reconstruct symbols 313 from the entropy coded video sequence. Categories of those symbols include information used to manage operation of the decoder 300, and potentially information to control a rendering device such as a display 312 that is not an integral part of the decoder but can be coupled to it. The control information for the rendering device(s) may be in the form of Supplementary Enhancement Information (SEI messages) or Video Usability Information parameter set fragments. The parser 304 may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser 304 may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser 304 may perform entropy decoding/parsing operation on the video sequence received from the buffer 303, so to create symbols 313. The parser 304 may receive encoded data, and selectively decode particular symbols 313. Further, the parser 304 may determine whether the particular symbols 313 are to be provided to a Motion Compensation Prediction unit 306, a scaler/inverse transform unit 305, an Intra Prediction Unit 307, or a loop filter 311.

Reconstruction of the symbols 313 can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser 304. The flow of such subgroup control information between the parser 304 and the multiple units below is not depicted for clarity.

Beyond the functional blocks already mentioned, decoder 300 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit 305. The scaler/inverse transform unit 305 receives quantized transform coefficient as well as control information, including which transform to use, block size, quantization factor, quantization scaling matrices, etc. as symbol(s) 313 from the parser 304. It can output blocks comprising sample values, that can be input into aggregator 310.

In some cases, the output samples of the scaler/inverse transform 305 can pertain to an intra coded block; that is: a block that is not using predictive information from previously reconstructed pictures, but can use predictive information from previously reconstructed parts of the current picture. Such predictive information can be provided by an intra picture prediction unit 307. In some cases, the intra picture prediction unit 307 generates a block of the same size and shape of the block under reconstruction, using surrounding already reconstructed information fetched from the current (partly reconstructed) picture 309. The aggregator 310, in some cases, adds, on a per sample basis, the prediction information the intra prediction unit 307 has generated to the output sample information as provided by the scaler/inverse transform unit 305.

In other cases, the output samples of the scaler/inverse transform unit 305 can pertain to an inter coded, and potentially motion compensated block. In such a case, a Motion Compensation Prediction unit 306 can access reference picture memory 308 to fetch samples used for prediction. After motion compensating the fetched samples in accordance with the symbols 313 pertaining to the block, these samples can be added by the aggregator 310 to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols 313 that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator 310 can be subject to various loop filtering techniques in the loop filter unit 311. Video compression technologies can include in-loop filter technologies that are controlled by parameters included in the coded video bitstream and made available to the loop filter unit 311 as symbols 313 from the parser 304, but can also be responsive to meta-information obtained during the decoding of previous (in decoding order) parts of the coded picture or coded video sequence, as well as responsive to previously reconstructed and loop-filtered sample values.

The output of the loop filter unit 311 can be a sample stream that can be output to the render device 312 as well as stored in the reference picture memory 557 for use in future inter-picture prediction.

Certain coded pictures, once fully reconstructed, can be used as reference pictures for future prediction. Once a coded picture is fully reconstructed and the coded picture has been identified as a reference picture (by, for example, parser 304), the current reference picture 309 can become part of the reference picture buffer 308, and a fresh current picture memory can be reallocated before commencing the reconstruction of the following coded picture.

The video decoder 300 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 302 may receive additional (redundant) data with the encoded video. The additional data may be included as part of the coded video sequence(s). The additional data may be used by the video decoder 300 to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

FIG. 4 may be a functional block diagram of a video encoder 400 according to an embodiment of the present disclosure.

The encoder 400 may receive video samples from a video source 401 (that is not part of the encoder) that may capture video image(s) to be coded by the encoder 400.

The video source 401 may provide the source video sequence to be coded by the encoder 303 in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source 401 may be a storage device storing previously prepared video. In a videoconferencing system, the video source 401 may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder 400 may code and compress the pictures of the source video sequence into a coded video sequence 410 in real time or under any other time constraints as required by the application. Enforcing appropriate coding speed is one function of Controller 402. Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller 402 as they may pertain to video encoder 400 optimized for a certain system design.

Some video encoders operate in what a person skilled in the art readily recognizes as a "coding loop." As an oversimplified description, a coding loop can consist of the encoding part of an encoder 402 ("source coder" henceforth) (responsible for creating symbols based on an input picture to be coded, and a reference picture(s)), and a (local) decoder 406 embedded in the encoder 400 that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory 405. As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder 406 can be the same as of a "remote" decoder 300, which has already been described in detail above in conjunction with FIG. 3. Briefly referring also to FIG. 4, however, as symbols are available and en/decoding of symbols to a coded video sequence by entropy coder 408 and parser 304 can be lossless, the entropy decoding parts of decoder 300, including channel 301, receiver 302, buffer 303, and parser 304 may not be fully implemented in local decoder 406.

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder 403 may perform motion compensated predictive coding, which codes an input frame predictively with reference to one or more previously-coded frames from the video sequence that were designated as "reference frames." In this manner, the coding engine 407 codes differences between pixel blocks of an input frame and pixel blocks of reference frame(s) that may be selected as prediction reference(s) to the input frame.

The local video decoder 406 may decode coded video data of frames that may be designated as reference frames, based on symbols created by the source coder 403. Operations of the coding engine 407 may advantageously be lossy processes. When the coded video data may be decoded at a video decoder, the reconstructed video sequence typically may be a replica of the source video sequence with some errors. The local video decoder 406 replicates decoding processes that may be performed by the video decoder on reference frames and may cause reconstructed reference frames to be stored in the reference picture cache 405. In this manner, the encoder 400 may store copies of reconstructed reference frames locally that have common content as the reconstructed reference frames that will be obtained by a far-end video decoder (absent transmission errors).

The predictor 404 may perform prediction searches for the coding engine 407. That is, for a new frame to be coded, the predictor 404 may search the reference picture memory 405 for sample data (as candidate reference pixel blocks) or certain metadata such as reference picture motion vectors, block shapes, and so on, that may serve as an appropriate prediction reference for the new pictures. The predictor 404 may operate on a sample block-by-pixel block basis to find appropriate prediction references. In some cases, as determined by search results obtained by the predictor 404, an input picture may have prediction references drawn from multiple reference pictures stored in the reference picture memory 405.

The controller 402 may manage coding operations of the video coder 403, including, for example, setting of parameters and subgroup parameters used for encoding the video data.

Output of all aforementioned functional units may be subjected to entropy coding in the entropy coder 408. The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter 409 may buffer the coded video sequence(s) as created by the entropy coder 408 to prepare it for transmission via a communication channel 411, which may be a hardware/software link to a storage device which would store the encoded video data. The transmitter 409 may merge coded video data from the video coder 403 with other data to be transmitted, for example, coded audio data and/or ancillary data streams.

The controller 402 may manage operation of the encoder 400. During coding, the controller 405 may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder 400 may perform coding operations according to a predetermined video coding technology or standard, such as ITU-T Rec. H.265. In its operation, the video coder 400 may perform various compression operations, including predictive coding operations that exploit temporal and spatial redundancies in the input video sequence. The coded video data, therefore, may conform to a syntax specified by the video coding technology or standard being used.

In an embodiment, the transmitter 409 may transmit additional data with the encoded video. The source coder 403 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Compressed video can be augmented, in the video bitstream, by supplementary enhancement information, for example in the form of Supplementary Enhancement Information (SEI) Messages or Video Usability Information (VUI). Video coding standards can include specifications parts for SEI and VUI. SEI and VUI information may also be specified in stand-alone specifications that may be referenced by the video coding specifications.

An SEI message for marking content that has been created and/or modified by a generative AI engine is disclosed to improve the technical implementation of potentially envisioned regulatory requirements and to help improve identification of AI generated content. The disclosed subject matter further relates to video coding and decoding and, more specifically, to the inclusion of marker in an SEI message to mark the use of a generative Artificial Intelligence to generate the content of a video segment.

Figure 5:
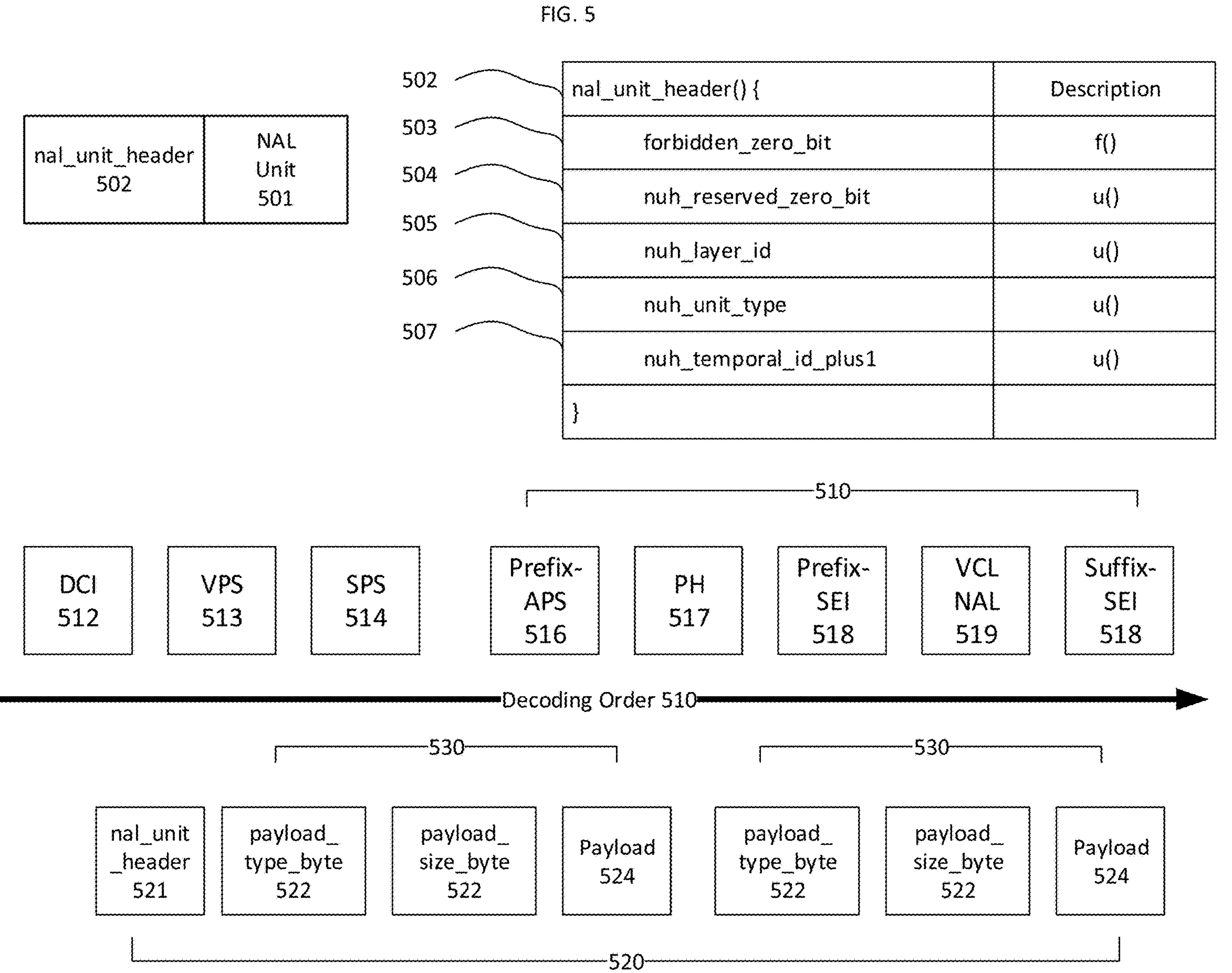
FIG. 5 is a schematic illustration of a NAL unit and SEI headers, in accordance with embodiments of the present disclosure.

FIG. 5 illustrates an exemplary layout of a Coded Video Sequence (CVS) in accordance with H.266. The coded video sequence is subdivided into Network Abstraction Layer units (NAL units). An exemplary NAL unit 501 can include a NAL unit header 502, which in turn comprises 16 bits as follows: a forbidden_zero_bit 503 and nuh_reserved_zero_bit 504 may be unused by H.266 and may be zero in a NAL unit. compliant with H.266. Three bits of nuh_layer_id 505 may be indicative of the (spatial, SNR, or multiview enhancement) layer to which the NAL unit belongs. Five bits of nuh_nal_unit_type define the type of NAL unit. In H.266, 22 NAL unit type values are defined for NAL unit types defined in H.266, six NAL unit types are reserved, and four NAL unit type values are unspecified and can be used by specifications other than H.266. Finally, three bits of the NAL unit header indicate the temporal layer to which the NAL unit belongs nuh_temporal_id_plusl 506.

A coded picture may contain one or more Video Coding Layer (VCL) NAL units and zero or more non-VCL NAL units. VCL NAL units may contain coded data conceptually belonging to a video coding layer as introduced before. Non-VCL NAL units may contain data conceptually belonging data not conceptually belonging to the video coding layer, and can be characterized into:

(1) Parameter sets, which comprise information that can be necessary for the decoding process and can apply to more than one coded picture. Parameter sets and conceptually similar NAL units may be of NAL unit types such as DCI_NUT (Decoding Capability Information (DCI)), VPS_NUT (Video Parameter Set (VPS), establishing, among other things, layer relationships), SPS_NUT (Sequence Parameter Set (SPS), establishing, among other things, parameters used and staying constant throughout a coded video sequence CVS), PPS_NUT (Picture Parameter Set (PPS), establishing, among other things, parameter used and staying constant within a coded picture), and PREFIX_APS_NUT and SUFFIX_APS_NUT (prefix and suffix Adaptation Parameter Sets). Parameter sets may include information required for a decoder to decode VCL NAL units, and hence are referred here as "normative" NAL units.

(2) Picture Header (PH_NUT), which is also a "normative" NAL unit.

(3) NAL units marking certain places in a NAL unit stream. Those include NAL units with the NAL unit types AUD_NUT (Access Unit Delimiter), EOS_NUT (End of Sequence) and EOB_NUT (End of Bitstream). These are non-normative, also known as informative, in the sense that a compliant decoder does not require them for its decoding process, although it needs to be able to receive them in the NAL unit stream.

(4) Prefix and Suffix SEI Nal unit types (PREFIX_SEI_NUT and SUFFIX_SEI_NUT) which indicate NAL units containing Prefix and Suffix supplementary enhancement information. IN H.266, those NAL units are informative, as they are not required for the decoding process.

(5) Filler Data NAL unit type FD_NUT indicates filler data; data that can be random and can be used to "waste" bits in a NAL unit stream or bitstream, which may be necessary for the transport over certain isochronous transport environments.

(6) Reserved and Unspecified NAL unit types.

Referring to FIG. 5, a layout of a NAL unit stream in decoding order 510 containing a coded picture 511 containing NAL units of some of the types previously introduced. Somewhere early in the NAL unit stream, DCI 512, VPS 513, and SPS 514 may, in combination, establish the parameters which the decoder can use to decode the coded pictures of a coded video sequence (CVS), including coded picture 511 of the NAL unit stream.

The coded picture 511 can contain, in the depicted order or any other order compliant with the video coding technology or standard in use: a Prefix APS 516, Picture header 517, prefix SEI 518, one or more VCL NAL units 519, and suffix SEI 520.

Prefix and suffix SEI NAL units (e.g., 518 and 520) were motivated during the standards development as, for some SEI messages, the content of the message would be known before the coding of a given picture commences, whereas other content would only be known once the picture were coded. Allowing certain SEI messages to appear early or late in a coded picture's NAL unit stream through prefix and suffix SEIs allows avoiding buffering. As one example, in an encoder the sampling time of a picture to be coded is known before the picture is coded, and hence the picture timing SEI message can be a prefix SEI message 516.

On the other hand, a decoded picture hash SEI message, which contains a hash of the sample values of a decoded pictures and can be useful, for example, to debug encoder implementations, is a suffix SEI message 518 as an encoder cannot calculate a hash over reconstructed samples before a picture has been coded. The location of Prefix and Suffix SEI NAL units may not be restricted to their position in the NAL unit stream. The phrase "Prefix" and "Suffix" may imply to what coded pictures or NAL units the Prefix/Suffix SEI message may pertain to, and the details of this applicability may be specified, for example in the semantics description of a given SEI message.

Referring again to FIG. 5, a simplified syntax diagram of a NAL unit that contains a prefix or suffix SEI message 520. This syntax is a container format for multiple SEI messages that can be carried in one NAL unit. Details of the emulation prevention syntax specified in H.266 are omitted here for clarity. As other NAL units, SEI NAL units start with a NAL unit header 521. The header is followed by one or more SEI messages; two are depicted (e.g., 530, 531 and described henceforth. Each SEI message inside the SEI NAL unit includes an 8 bit payload_type_byte 522 which specifies one of 256 different SEI types; an 8 bit payload_size_byte 523 which specifies the number of bytes of the SEI payload, and payload_size-byte number of bytes Payload 524. This structure can be repeated until a payload_type_byte equal to 0xff is observed, which indicates the end of the NAL unit. The syntax of the Payload 524 depends on the SEI message, it can be of any length between 0 and 255 bytes.

Generative AI has become a challenging new technology form a societal viewpoint. Modifying, or "doctoring" media such as audio, images, and video, which until a few years ago required specialized, highly developed talent and skills, and often a significant amount of time and at significant cost, is now available to individuals with access to computers and the Internet for free or at comparatively low cost. Content creation increasingly relies on AI-based tools. Many view the use of AI to create new, original content as just another tool, akin to a brush or a violin.

However, content is created using AI for arguably malicious reasons faking speeches of politicians or other media stars, creating fake documentary evidence that may be confused as original, etc. The quality of such modification is good enough that it takes a trained observer to distinguish between fake and real (microphone/camera-captured) content without relying on semantics. The risks of abuse of such technology are widely considered big enough to harm society as a whole. Accordingly, AI marking techniques are needed.

In this disclosure, create, modify, and generate are used. Create may refer to creation of media by the AI without specifically being guided by input media and relying only on its own models/databases as well as content generally available over the Internet. In contrast, modifying of content by an AI refers to modification by the AI of user-supplied media based on user instructions. Generate, is used to mean either create or modify.

Explicit marks/warning segments in audible or visual form (such as screen content showing letters/words/sentences indicative of the use of AI) take time of the consumer and are therefore often considered annoying and can easily be cut out. Further, if the content is mixed between AI-created and/or AI-modified and original, it could be hard and even more annoying to mark only AI-based segments and unmark the remaining content without even further consumer annoyance.

Watermarking is a technique that can be employed in both audio and video, where for example the AI-generated content is marked through embedding of invisible/inaudible marks, or marks that may be visible/audible but are not as annoying as explicit marking segments. Watermarking comes in many forms, some of which can persist through possibly multiple encoding/decoding steps. Invisible watermarking can be brought to the user's attention through applications looking specifically for watermarks. Watermarks conceptually can be applied in the compressed or source/reconstructed domain, and techniques for both exist. Watermarking can be designed such that it is very hard to remove it without destroying the content of the audio/video. However, watermarking can be computationally expensive to encode and decode, and for some media types there are currently no standards for watermarking that would allow for interoperable implementations. Watermarking can also consume significant bitrate overhead; especially the more subtle and more robust versions of it. That's even more true if the information conveyed within the watermark goes beyond simple Boolean on/off signals.

AI marking through the insertion of metadata into the audio-visual streams may also be done. Metadata can be very efficient and can be placed in picture/audio-frame exact locations thereby enabling precise marking of AI-generated content. Metadata can convey as much or as little information as desirable, and is in many cases computationally inexpensive. However, metadata can, in many cases, be easily modified or removed from content.

According to an embodiment, all three marking options mentioned above (and perhaps others) may be used. Marking segments could be short and could serve as a form that allows legacy consumer-equipment to render an AI-warning. Watermarking may be used as a reasonably interference-resistant marking mechanism for individual or groups of audio frames, pictures, or AI-based video segments. Metadata, finally, may be the best technique to identify which modifications have been employed, which AI engine was used, a timestamp of creation/modification, and so forth.

According to an embodiment, metadata for marking purposes in the form of Supplementary Enhancement Information (SEI) messages may be used.

One or more SEI messages can be carried in a NAL unit. The concept of an SEI message can also apply to other NAL-unit based coding technologies, even if in their specifications the term "SEI message" may not exist. Further, the disclosed subject matter may also be applicable beyond NAL-unit based codecs as long as the bitstream format of the codec or bitstream formatter in question allows the insertion of a bitstream into the coded media bits whose format can be associated with metadata. Such codecs or bitstream formatters may include audio, or system-layer multiplexing standards. For clarity, the description below assumes the aforementioned SEI message syntax or a syntax closely related to it, but a person skilled in the art will be able to adapt or modify the inventive subject matter to application needs beyond SEI messages. Also, the description below focusses on a video stream that consists of one or more pictures coded in a format that supports an H.266-like SEI message, but the disclosure is not limited thereto.

According to embodiments, the AI mark may include at least the following items:

Identification of the content as AI-generated/modified content;

Identity of the tool used to create/modify the content; and

A timestamp of the content creation/modification.

Other possible information that may be considered is an identification of the content used before modifications (if any), and the instructions the AI has received to create/modify the content.

In an embodiment, metadata suitable for marking one or more coded pictures in a coded video sequence as being generated or modified by an AI may have syntax as shown in FIG. 6. Two syntaxes are disclosed, but the disclosure is not limited thereto.

As shown in FIG. 6, an ai_mark_cancel flag 610, when true, may cancel the previously received ai_mark 601 SEI message and resets the state of any variables related to AI marking to undefined-however, see also the ai_mark_persistence flag 612 below. When the flag is false 611, at least the current picture may be marked as AI generated. Further, the syntax may force the presence of additional syntax elements, which in combination may mark the current picture or the next picture—depending on whether the SEI message is a prefix or suffix SEI message—as generated or modified by an AI.

An ai_mark_persistence_flag 612, when 0, may indicate that the remaining information within the ai_mark SEI 601 pertains to the current decoded picture only. The ai_mark_persistence_flag 612, when 1, may indicate that the ai marking SEI message may apply to the current decoded picture and may persists all subsequent pictures in output order until one or more of the following conditions are true:

A new coded video sequence begins;

The bitstream ends; and

A picture with an ai_mark SEI message is output that follows the current picture in output order.

The form of an ai_mark SEI message 601 may have a design where the marking information may be included in one string 620. In the same or another embodiment, the format of the string 620 could be free-form. In some embodiments, there may be a text description purpose parameter that indicates the purpose of the text description SEI message, e.g., string 620. The value of the text description purpose parameter may be 0 to 255 inclusive. As an example, the value of the text description purpose parameter being 2 may indicate that the string 620 contains AI marking information that pertains to one or more pictures. It should be noted that FIG. 6 is exemplary and not intended to be a limiting example.

In a same or another embodiment, the string 620 may, when not a null string, AI marking information that pertains to the picture(s) within the persistence scope of this SEI message. Additionally, the string can contain information about the machine-learning-based processing, intended use of the decoded pictures, or other aspects relevant to the associated pictures.

In the same or another embodiment, the string 620 could be required by the semantics to be in a certain structured format. That format may be defined in the semantics. As an example, the string may be required to be in a format according to the c-style format string "Tool: % s Timestamp: % ld". A person familiar with the C programming language will readily understand that % s refers to a zero-terminated character sequence (where the zero is being omitted when the character sequence is printed using printf( ) or sprintf( ) and % ld refers to a long, for example 64 bit long, signed integer. The semantics may require that the character sequence replacing the % s may be a suitable identification of the AI tool that was used to generate the content—for example an URI, whereas the 64 bit integer replacing % ld may be the time, measured in seconds since Jan. 1, 1970, when the content was generated by the AI—this is known as Unix time or epoch time.

In the same or another embodiment, the format of the string 620 could be in json format, with json codepoints including, but not necessarily limited to, a tool identifier and a date and time. In this case, the string 620 could look as follows

```
{
  "tool": "https://www.starryai.com"
  "time": "Nov 27, 2023, 14:33 Z"
}
```

where "https://www.starryai.com" is the URI of the AI tool in use, and "Nov. 27, 2023, 14:33 Z" represents the timestamp at which the AI engine ran. The timecode above is self-explanatory to a person skilled in the art, The "Z" at the end of the timecode represents the "Zulu" time zone, commonly known as Coordinated Universal Time.

In the same or another embodiment, the string 620 could follow other structural content representation languages such as, for example, XML or ASN.1. In embodiments, syntax restrictions can be spelled out in free-form language in the semantics, or may be enforced through the mandated use of a schema or equivalent.

Further referring to FIG. 6, in an embodiment, the presence of information deemed required in the standards setting committee may also be enforced through the use of the H.266 (or equivalent) syntax. Doing so can have the advantage of coding efficiency, as the video coding syntax is designed with minimal overhead in mind and in case of an AI marking SEI considerably more efficient than character-based syntax mechanisms like JSON or XML.

The SEI message 630 may contain beyond the ai_mark_cancel_flag 610 and the ai_mark_persistence_flag 612 also the unconditionally present ai_tool_id_string 631 and the ai_timestamp_string 632. The term "unconditionally" here refer to that they are not gated by individual presence flags, in contrast to a syntax element introduced later.

The ai_tool_id_string 631 may be required by the semantics to include appropriate identification information, for example an URI, of the AI tool used to generate the video content. A similar concept was already introduced above in the context of the JSON syntax.

To code a timestamp 632, a sensible option can be an RFC 3339-compliant timestamp string. RFC3339 specifies a subset of the options offered in ISO IS 8601, and mandates certain fields including year, month, day, hour, and minute (of which only the year is mandated in ISO 8601). Insofar, RFC 3339 is sometimes considered a practically useful variant of ISO 8601 to specify time on the Internet. An RFC 3339-formatted string can, for example, be in a format such as "2023-11-27T14:33Z". However, many other date/time representations are also known in the field and could equally be used to code the timestamp 632. Advantageously, the semantics description of the SEI message may specify the format to be used, so to enable automatic parsing.

If the regulatory language introduced was same worldwide and for the foreseeable future, an SEI message with just the content presented so far may be sufficient for AI marking purposes. However, SEI messages cannot be extended so to preserve backward compatibility. In other words, a format would need to be found that includes ideally all data elements regulators or legislators throughout the world may require in the foreseeable future. Creating such an exhaustive list may be difficult to achieve. Further, regulators in different countries may set not only different, but contradicting requirements, for example when it comes to the presence of information pertaining to individuals, and different priorities with respect to privacy rights versus marking requirements.

Embodiments of the present disclosure include and provide methods to overcome the above-mentioned difficulties.

In an embodiments, a field may be gated by a presence flag. In this example, ai_person_id 634, as an example, is gated by an ai_person_id_presence flag 633. If that presence flag 633 is 0, the syntax forces the ai_person_id string 634 to be not present; if it is one, the string ai_person_id 634 is present. This mechanism can be used, for example, as follows: when the generating AI is located in a country where the regulator requires the inclusion of a person identifier, then AI is required to query such information from the person instructing it and make it available to the bitstream encoder for inclusion in the SEI message, with the flag 633 set to 1 and the person id coded into the string 634. On the other hand, in a country that priories personal privacy over marking, the AI would not query the user, and the encoder would set the flag 633 to 0 hence omitting the string 634 with the person identification. This mechanism has the advantage that only a single bit is used for conditionally mandatory information—the condition being a mandate of presence by the regulator—unless details are required.

In the same or another embodiment, instead of gating flags, the semantics could also state that, from the viewpoint of the standard, a string with a length of 0 is sufficient. For integers, a value that's unlikely or impossible to occur may be used. For dates, a generic date that pre-date generative AI applications, such as Jan. 1, 1970, may be used.

As for the problem of lack of extensibility of SEI messages, in the same or another embodiment, one solution can be to include, in addition to various previously described syntax elements, some of which gated by presence flags or allowed to have zero-length strings or the equivalent for other date types as described above, a free-form string "ai_other_regulatory" 635, into which a regulatory-compliant AI/encoder can include relevant marking information that cannot be represented by other fields.

In the same or another embodiment, the SEI message can contain, gated by a presence flag 636, the instructions 637 the AI used to generate the content. Such instructions may be in the form of an URI, a plain text field, a JSON coded string, etc.

In the same or another embodiment, when the AI is modifying user supplied content instead of creating content based on, for example its internal model, it can be advantageous to supply that information. As one possible implementation, there could be a string ai_base_content 639 gated by a presence flag 638. That string can include, for example, a comma-separated list of URIs pointing to the content that is modified. An empty string in ai_bas_content 639 can, for example, signify that content was specifically fed into the AI, but that such content is not available using an URI (for example, a life stream that has not been stored, private content not available over the Internet, and so forth). In that case, the presence flag 638 would serve the additional purpose of indicating that existing content was modified without identifying the content itself.

Figure 7:
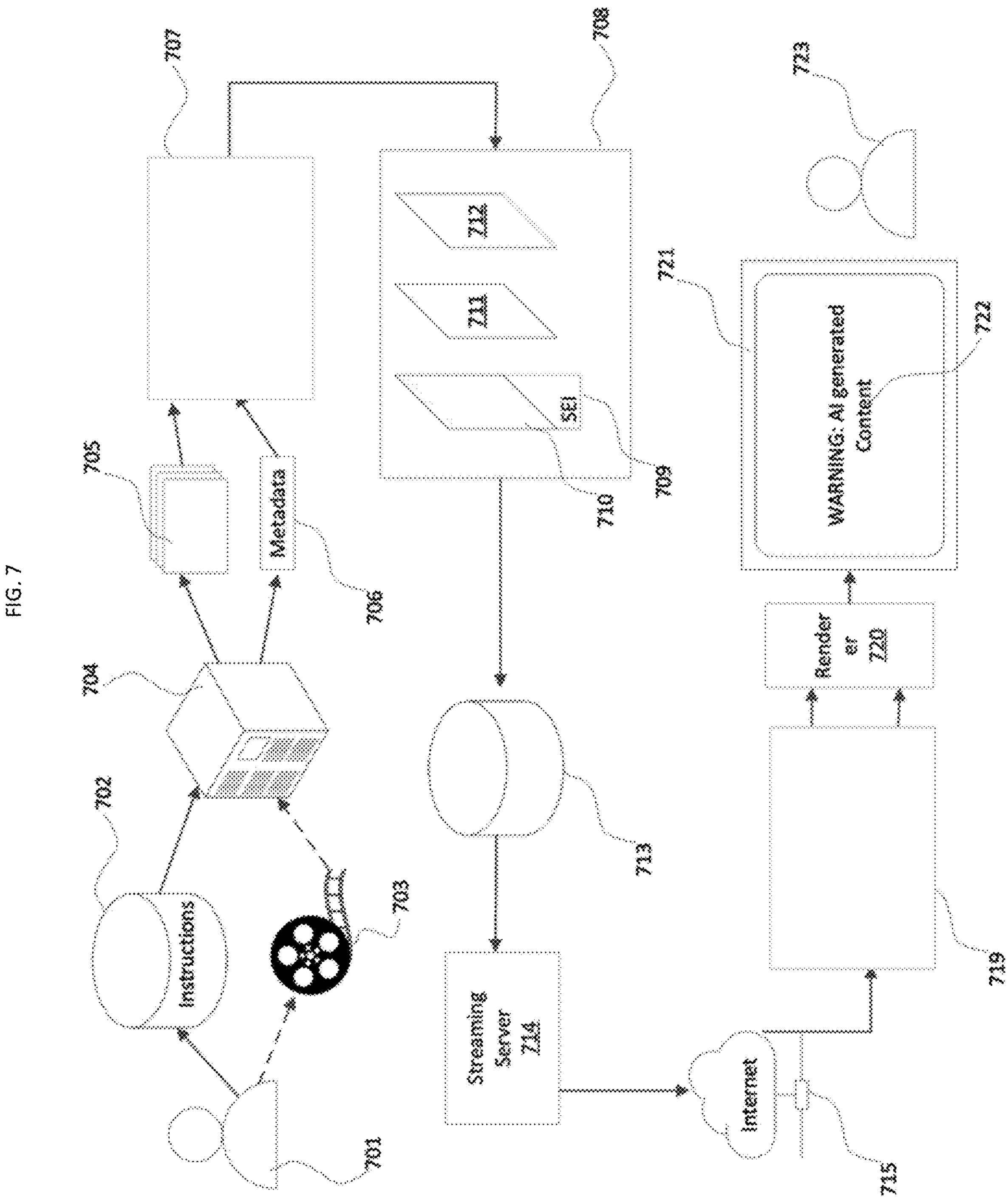
FIG. 7 is a schematic illustration of a system in accordance with embodiments of the present disclosure.

FIG. 7 illustrates a system that involves generative AI. A producer user 701 may have created instructions 702 for the generative AI engine 704. Those instructions may be a few words of free-form text (for example "create a 10 second video showing a panda riding a bicycle through a city"), or more complex. For example, the instructions may be a video stream itself providing instructions in the form of sign language. In an AI-creative context, as introduced above, these instruction may be the only user-supplied information the AI responds to. In an AI-modifying context, the AI may also receive a user-specified content to modify 703, here shown as a film reel. Mixing forms of these two technologies may also be possible; for example, the content to modify 703 may include metadata that contains instructions to the AI engine 704 on how to modify the content.

Details about the mechanism which is used to supply the AI engine 704 with user-provided instructions 702 and, in the modifying content only, the content 703 to be modified, or omitted here. In some cases, the AI engine may be physically located in a datacenter operated by a third party provider, in which case it is likely supplied with instructions 702 and content 703 over the Internet using, for example, an interactive web page. However, other forms of transmission of instructions 702 and content 703 from the user 701 to the AI engine 704 are also envisioned.

The AI engine 704 may take the instructions 702 and, in the modifying use case, the content 703, to create outgoing possibly uncompressed media, in this example a uncompressed series of images (and timing information) that together form an uncompressed video stream 705. The AI engine may also generate certain metadata 706 including, for example, data representing the various syntax elements described in conjunction with FIG. 6 above.

Both uncompressed video stream 705 and metadata 706 may be input to a video encoder 707. The video encoder 707 may compress the uncompressed video stream 705 into a compressed video stream 708 that may include SEI messages 709 associated with certain encoded pictures in the coded video bitstream 708. Shown in the example here are three coded pictures (e.g., 710, 711, 712, with only the first coded picture 710) has an associated SEI message 709.

The coded video bitstream 708 may be distributed to consuming users, that may include the producing user 701, in ways known to a person skilled in the art. Depicted here is that the coded video stream 709 is stored in a file 713, and then streamed by a streaming server 714 and over a network 715 to a consuming user's endpoint. The endpoint may include a video decoder 719 which reconstructs the streamed coded video stream 709 into a series of decoded pictures 720. The decoder 719 may also extract, from the SEI messages 709 included in the coded video stream 708, AI marking information along with other metadata. Therefore, the AI marking information is now available at the consuming user's endpoint.

The received marking information may be used as prescribed in the regulatory environment where the decoder and display resides, which may be different form the regulatory environment that rules what the AI needs to include.

Different scenarios conceivable include:

(1) It may be mandated by regulation that the consuming user is advised that the content is AI generated. In that case, upon the beginning of a video segment that is marked as including AI-generated content, the decoder 719, renderer 720, or display 721 may insert a warning in visible form on the screen 722, visible to the consuming user 723. Such warnings may be in the form of characters, logos, audible, or in any other suitable form.

(2) It may be required that decoders 719, renderers 720, or displays 721 offer a consuming user the option to be warned by aforementioned means. Alternatively, or in addition, a user may be able to setup his decoder 719 renderer 720 display 721 such that AI-generated content may not be displayed, similarly to MPAA ratings that are widely used to label content for adequacy for consumption by certain age groups with or without adult supervision. A combination of MPAA enforcement and AI mark based warnings may also be possible. For example, an endpoint could be set up such that it would consider AI-based content as "R" rated, in which case, assuming correctly configured endpoint settings, only a mature audience would be exposed to AI-based content.

In even more tolerant settings, a decoder/renderer/display may ignore the marking SEI messages.

The techniques described above, can be implemented as computer software using computer-readable instructions and physically stored in one or more computer-readable media or by a specifically configured one or more hardware processors. For example, FIG. 8 shows a computer system 800 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 8:
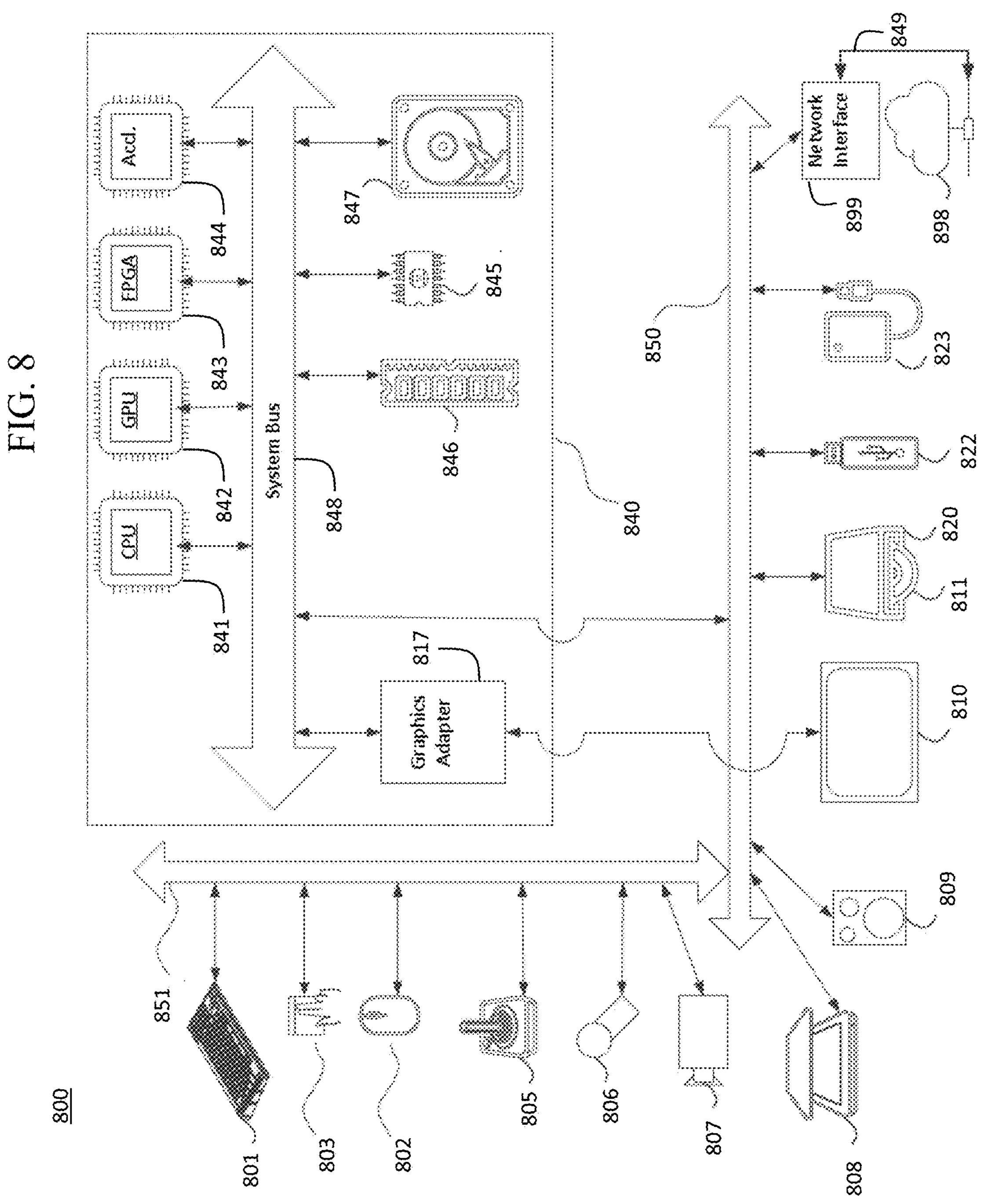
FIG. 8 is an exemplary diagram of a computer system suitable for implementing embodiments.

The components shown in FIG. 8 for computer system 800 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 800.

Computer system 800 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 801, mouse 802, trackpad 803, touch screen 810, joystick 805, microphone 806, scanner 808, camera 807.

Computer system 800 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 810, or joystick 805, but there can also be tactile feedback devices that do not serve as input devices), audio output devices (such as: speakers 809, headphones (not depicted)), visual output devices (such as screens 810 to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system 800 can also include human accessible storage devices and their associated media such as optical media including CD/DVD ROM/RW 820 with CD/DVD 811 or the like media, thumb-drive 822, removable hard drive or solid state drive 823, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 800 can also include interface 899 to one or more communication networks 898. Networks 898 can for example be wireless, wireline, optical. Networks 898 can further be local, wide-area, metropolitan, vehicular and industrial, real-time, delay-tolerant, and so on. Examples of networks 898 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 898 commonly require external network interface adapters that attached to certain general-purpose data ports or peripheral buses (850 and 851) (such as, for example USB ports of the computer system 800; others are commonly integrated into the core of the computer system 800 by attachment to a system bus as described below (for example Ethernet interface into a PC computer system or cellular network interface into a smartphone computer system). Using any of these networks 898, computer system 800 can communicate with other entities. Such communication can be uni-directional, receive only (for example, broadcast TV), uni-directional send-only (for example CANbusto certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 840 of the computer system 800.

The core 840 can include one or more Central Processing Units (CPU) 841, Graphics Processing Units (GPU) 842, a graphics adapter 817, specialized programmable processing units in the form of Field Programmable Gate Areas (FPGA) 843, hardware accelerators for certain tasks 844, and so forth. These devices, along with Read-only memory (ROM) 845, Random-access memory 846, internal mass storage such as internal non-user accessible hard drives, SSDs, and the like 847, may be connected through a system bus 848. In some computer systems, the system bus 848 can be accessible in the form of one or more physical plugs to enable extensions by additional CPUs, GPU, and the like. The peripheral devices can be attached either directly to the core's system bus 848, or through a peripheral bus 849. Architectures for a peripheral bus include PCI, USB, and the like.

CPUs 841, GPUs 842, FPGAs 843, and accelerators 844 can execute certain instructions that, in combination, can make up the aforementioned computer code. That computer code can be stored in ROM 845 or RAM 846. Transitional data can be also be stored in RAM 846, whereas permanent data can be stored for example, in the internal mass storage 847. Fast storage and retrieval to any of the memory devices can be enabled through the use of cache memory, that can be closely associated with one or more CPU 841, GPU 842, mass storage 847, ROM 845, RAM 846, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 800, and specifically the core 840 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 840 that are of non-transitory nature, such as core-internal mass storage 847 or ROM 845. The software implementing various embodiments of the present disclosure can be stored in such devices and executed by core 840. A computer-readable medium can include one or more memory devices or chips, according to particular needs. The software can cause the core 840 and specifically the processors therein (including CPU, GPU, FPGA, and the like) to execute particular processes or particular parts of particular processes described herein, including defining data structures stored in RAM 846 and modifying such data structures according to the processes defined by the software. In addition or as an alternative, the computer system can provide functionality as a result of logic hardwired or otherwise embodied in a circuit (for example: accelerator 844, which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The above disclosure also encompasses the features noted below. The features may be combined in various manners and are not limited to the combinations noted below.

(1) A method of video encoding and/or decoding, the method including setting a first value of a text description purpose parameter in a bitstream, the first value of the text description purpose parameter indicating a type of information included in a text description information string in the bitstream; setting artificial intelligence (AI) marking information associated with one or more pictures in the bitstream as the text description information string when the first value indicates that the type of information included in the text description information string comprises marking information associated with one or more artificial intelligence processes used; signaling the text description purpose parameter in the bitstream; and signaling the text description information string.

(2) The method of feature (1), in which the text description purpose parameter and the text description information string are signaled in a supplemental enhancement information (SEI) message.

(3) The method of any of the features of (1) to (2), in which the AI marking information associated the one or more pictures comprises an indication that the one or more pictures is generated using a machine learning based process.

(4) The method of any of the features of (1) to (3), in which the AI marking information associated the one or more pictures further comprises: a tool identifier indicating a tool used to generate the one or more pictures using the machine learning based process, a timestamp indicating a time at which the tool was used to generate the one or more pictures using the machine learning based process, or one or more instructions used by the tool to generate the one or more pictures.

(5) The method of any of the features of (1) to (4), in which when the text description information string is not a null string, the text description information string comprises AI marking information associated with pictures within a scope of the SEI message.

(6) The method of any of the features of (1) to (5), in which the text description purpose parameter has a value between 0 and 255.

(7) The method of any of the features of (1) to (6), in which the text description information string is in a string format.

(8) The method of any of the features of (1) to (7), in which the method further comprises receiving a coded video bitstream comprising pictures; obtaining a first value of a text description purpose parameter in the coded video bitstream, the first value of the text description purpose parameter indicating a type of information included in a text description information string in the coded video bitstream; obtaining, responsive to the first value indicating that the type of information included in the text description information string comprises marking information associated with one or more artificial intelligence processes used, an artificial intelligence (AI) marking information associated with one or more pictures in the coded video bitstream as the text description information string in the coded video bitstream; and reconstructing the pictures from the coded video bitstream based on the first value and the AI marking information.

(9) The method of any of the features of (1) to (8), in which the text description purpose parameter and the text description information string are signaled in a supplemental enhancement information (SEI) message.

(10) The method of any of the features of (1) to (9), in which the AI marking information associated the one or more pictures comprises an indication that the one or more pictures is generated using a machine learning based process.

(11) The method of any of the features of (1) to (10), in which the AI marking information associated the one or more pictures further comprises: a tool identifier indicating a tool used to generate the one or more pictures using the machine learning based process, a timestamp indicating a time at which the tool was used to generate the one or more pictures using the machine learning based process, or one or more instructions used by the tool to generate the one or more pictures.

(12) The method of any of the features of (1) to (11), in which when the text description information string is not a null string, the text description information string comprises AI marking information associated with at least one picture within a scope of the SEI message.

(13) The method of any of the features of (1) to (12), the method further includes performing a conversion between a visual media file and a bitstream of the visual media file according to a format rule, in which the bitstream includes a text description purpose parameter indicating a type of information included in a text description information string; and artificial intelligence (AI) marking information associated with one or more pictures in the visual media file as the text description information string when the text description purpose parameter indicates that the type of information included in the text description information string comprises marking information associated with one or more artificial intelligence processes used; in which the format rule specifies that the text description purpose parameter and the text description information string are syntax parameters in a supplemental enhancement information (SEI) message.

(14) The method of any of the features of (1) to (13), in which the text description information string is in a string format.

(15) An apparatus for video decoding, including processing circuitry that is configured to perform the method of any of features (1) to (14).

(16) An apparatus for video encoding, including processing circuitry that is configured to perform the method of any of features (1) to (14).

(17) A non-transitory computer-readable storage medium storing instructions which when executed by at least one processor cause the at least one processor to perform the method of any of features (1) to (14).

What is claimed is:

1. A method of video processing, the method being executed by at least one processor, and the method comprising:

setting a first value of a text description purpose in a bitstream, the first value of the text description purpose indicating a type of information included in a text description string in the bitstream, the text description purpose having a numerical value equal to or greater than zero;

when the first value indicates that the type of information included in the text description string comprises marking information associated with one or more artificial intelligence processes used, setting a second value of the text description string in the bitstream, the second value of the text description string comprising artificial intelligence (AI) marking information associated with one or more pictures within a persistence scope of a supplemental enhancement information (SEI) message in the bitstream;

signaling the text description purpose in the bitstream; and signaling the text description string.

2. The method of claim 1, wherein the text description purpose and the text description string are signaled in the SEI message.

3. The method of claim 2, wherein the AI marking information associated with the one or more pictures comprises an indication that the one or more pictures is generated using a machine learning based process.

4. The method of claim 3, wherein the AI marking information associated with the one or more pictures further comprises:

a tool identifier indicating a tool used to generate the one or more pictures using the machine learning based process, a timestamp indicating a time at which the tool was used to generate the one or more pictures using the machine learning based process, or one or more instructions used by the tool to generate the one or more pictures.

5. The method of claim 2, wherein when the text description string is not a null string, the text description string comprises AI marking information associated with pictures within a scope of the SEI message.

6. The method of claim 1, wherein the text description purpose has a value between 0 and 255.

7. The method of claim 1, wherein the text description string is in a string format.

8. An apparatus for video processing, the apparatus comprising at least one memory storing a program code; and at least one processor configured to access the at least one memory and operate as instructed by the program code, the program code comprising:

receiving code configured to cause the at least one processor to receive a coded video bitstream comprising pictures;

first obtaining code configured to cause the at least one processor to obtain a first value of a text description purpose in the coded video bitstream, the first value of the text description purpose indicating a type of information included in a text description string in the coded video bitstream, the text description purpose having a numerical value equal to or greater than zero;

second obtaining code configured to cause the at least one processor to, responsive to the first value indicating that the type of information included in the text description string comprises marking information associated with one or more artificial intelligence processes used, obtain a second value of the text description string in the coded video bitstream, the second value of the text description string comprising artificial intelligence (AI) marking information associated with one or more pictures within a persistence scope of a supplemental enhancement information (SEI) message in the coded video bitstream; and reconstructing code configured to cause the at least one processor to reconstruct the pictures from the coded video bitstream based on the first value and the second value.

9. The apparatus of claim 8, wherein the text description purpose and the text description string are signaled in the SEI message.

10. The apparatus of claim 9, wherein the AI marking information associated with the one or more pictures comprises an indication that the one or more pictures is generated using a machine learning based process.

11. The apparatus of claim 10, wherein the AI marking information associated with the one or more pictures further comprises:

a tool identifier indicating a tool used to generate the one or more pictures using the machine learning based process, a timestamp indicating a time at which the tool was used to generate the one or more pictures using the machine learning based process, or one or more instructions used by the tool to generate the one or more pictures.

12. The apparatus of claim 9, wherein when the text description string is not a null string, the text description string comprises AI marking information associated with at least one picture within a scope of the SEI message.

13. The apparatus of claim 8, wherein the text description purpose has a value between 0 and 255.

14. The apparatus of claim 8, wherein the text description string is in a string format.

15. A non-transitory computer-readable storage medium storing instructions and a video bitstream that are generated by a video encoding method, the instructions, when executed by a computer, cause the computer to implement the video encoding method comprising:

setting a first value of a text description purpose in a bitstream, the first value of the text description purpose indicating a type of information included in a text description string in the bitstream, the text description purpose having a numerical value equal to or greater than zero;

when the first value indicates that the type of information included in the text description string comprises marking information associated with one or more artificial intelligence processes used, setting a second value of the text description string in the bitstream, the second value of the text description string comprising artificial intelligence (AI) marking information associated with one or more pictures within a persistence scope of a supplemental enhancement information (SEI) message in the bitstream;

signaling the text description purpose in the bitstream;

signaling the text description string; and transmitting the bitstream.

16. The non-transitory computer readable medium of claim 15, wherein the AI marking information associated with the one or more pictures comprises an indication that the one or more pictures is generated using a machine learning based process.

17. The non-transitory computer readable medium of claim 16, wherein the AI marking information associated with the one or more pictures further comprises:

a tool identifier indicating a tool used to generate the one or more pictures using the machine learning based process, a timestamp indicating a time at which the tool was used to generate the one or more pictures using the machine learning based process, or one or more AI generation instructions used by the tool to generate the one or more pictures.

18. The non-transitory computer readable medium of claim 15, wherein when the text description string is not a null string, the text description string comprises AI marking information associated with pictures within a scope of the SEI message.

19. The non-transitory computer readable medium of claim 15, wherein the text description purpose has a value between 0 and 255.

20. The non-transitory computer readable medium of claim 15, wherein the text description string is in a string format.

* * * * *